US006687672B2

(12) United States Patent
Souilmi et al.

(10) Patent No.: US 6,687,672 B2
(45) Date of Patent: Feb. 3, 2004

(54) METHODS AND APPARATUS FOR BLIND CHANNEL ESTIMATION BASED UPON SPEECH CORRELATION STRUCTURE

(75) Inventors: Younes Souilmi, Juan-les Pins (FR); Luca Rigazio, Santa Barbara, CA (US); Patrick Nguyen, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 28 days.

(21) Appl. No.: 10/099,428

(22) Filed: Mar. 15, 2002

(65) Prior Publication Data

US 2003/0177003 A1 Sep. 18, 2003

(51) Int. Cl.[7] ......................... G10L 15/08; G10L 19/04; G10L 19/08

(52) U.S. Cl. ....................... 704/237; 704/233; 704/226; 704/219; 704/216; 381/94.3

(58) Field of Search ................................. 704/233, 226, 704/227, 228, 207, 203, 204, 219, 214, 215, 216, 208, 209, 237; 381/94.3

(56) References Cited

U.S. PATENT DOCUMENTS

| | | | | | |
|---|---|---|---|---|---|
| 4,897,878 | A | * | 1/1990 | Boll et al. | 704/233 |
| 5,487,129 | A | * | 1/1996 | Paiss et al. | 704/233 |
| 5,625,749 | A | * | 4/1997 | Goldenthal et al. | 704/254 |
| 5,839,103 | A | | 11/1998 | Mammone et al. | |
| 5,864,810 | A | | 1/1999 | Digalakis et al. | |
| 5,913,192 | A | | 6/1999 | Parthasarathy et al. | |
| 6,278,970 | B1 | * | 8/2001 | Milner | 704/203 |
| 6,430,528 | B1 | * | 8/2002 | Jourjine et al. | 704/200 |
| 6,496,795 | B1 | * | 12/2002 | Malvar | 704/203 |

FOREIGN PATENT DOCUMENTS

| | | |
|---|---|---|
| WO | WO 99/59136 | 11/1999 |

OTHER PUBLICATIONS

Tong et al., ("Blind Channel Estimation by least squares smoothing", Proceedings of the 1998 IEEE International Conference o Acoustics, Speech, and Signal Processing, 1998. ICASSP'98, May 1998, vol. 4, pp. 2121–2124).*

"Blind Channel Estimation By Least Squares Smoothing", Lang Tong and Qing Zhao, Acoustics, Speech, and Signal Processing, ICASSP '98, Proceedings of the 1998 IEEE International Conference on May 12, 1998 to May 15, 1998, Seatle, Washington, vol. 4, 0–7803–4428–6/98, pp. 2121–2124.

"Pole–Filtered Cepstral Subtraction", D. Naik, 1995 International Conference on Acoustics, Speech, and Signal Processing, May, 1995, vol. 1, pp. 157–160, particularly 160.

International Search Report for International Application No. PCT/US99/10038, Jun. 16, 1999, by Martin Lerner.

* cited by examiner

*Primary Examiner*—Vijay Chawan
(74) *Attorney, Agent, or Firm*—Harness, Dickey & Pierce, PLC

(57) ABSTRACT

Methods and apparatus for blind channel estimation of a speech signal corrupted by a communication channel are provided. One method includes converting a noisy speech signal into either a cepstral representation or a log-spectral representation; estimating a correlation of the representation of the noisy speech signal; determining an average of the noisy speech signal; constructing and solving, subject to a minimization constraint, a system of linear equations utilizing a correlation structure of a clean speech training signal, the correlation of the representation of the noisy speech signal, and the average of the noisy speech signal; and selecting a sign of the solution of the system of linear equations to estimate an average clean speech signal in a processing window.

39 Claims, 4 Drawing Sheets

METHODS AND APPARATUS FOR BLIND CHANNEL ESTIMATION BASED UPON SPEECH CORRELATION STRUCTURE

BACKGROUND OF THE INVENTION

The present invention relates to methods and apparatus for processing speech signals, and more particularly for methods and apparatus for removing channel distortion in speech systems such as speech and speaker recognition systems.

Cepstral mean normalization (CMN) is an effective technique for removing communication channel distortion in automatic speaker recognition systems. To work effectively, the speech processing windows in CMN systems must be very long to preserve phonetic information. Unfortunately, when dealing with non-stationary channels, it would be preferable to use smaller windows that cannot be dealt with as effectively in CMN systems. Furthermore, CMN techniques are based on an assumption that the speech mean does not carry phonetic information or is constant during a processing window. When short windows are utilized, however, the speech mean may carry significant phonetic information.

The problem of estimating a communication channel affecting a speech signal falls into a category known as blind system identification. When only one version of the speech signal is available (i.e., the "single microphone" case), the estimation problem has no general solution. Oversampling may be used to obtain the information necessary to estimate the channel, but if only one version of the signal is available and no oversampling is possible, it is not possible to solve each particular instance of the problem without making assumptions about the signal source. For example, it is not possible to perform channel estimation for telephone speech recognition, when the recognizer does not have access to the digitizer, without making assumptions about the signal source.

SUMMARY OF THE INVENTION

One configuration of the present invention therefore provides a method for blind channel estimation of a speech signal corrupted by a communication channel. The method includes converting a noisy speech signal into either a cepstral representation or a log-spectral representation; estimating a temporal correlation of the representation of the noisy speech signal; determining an average of the noisy speech signal; constructing and solving, subject to a minimization constraint, a system of linear equations utilizing a correlation structure of a clean speech training signal, the correlation of the representation of the noisy speech signal, and the average of the noisy speech signal; and selecting a sign of the solution of the system of linear equations to estimate an average clean speech signal over a processing window.

Another configuration of the present invention provides an apparatus for blind channel estimation of a speech signal corrupted by a communication channel. The apparatus is configured to convert a noisy speech signal into either a cepstral representation or a log-spectral representation; estimate a temporal correlation of the representation of the noisy speech signal; determine an average of the noisy speech signal; construct and solve, subject to a minimization constraint, a system of linear equations utilizing a correlation structure of a clean speech training signal, the correlation of the representation of the noisy speech signal, and the average of the noisy speech signal; and select a sign of the solution of the system of linear equations to estimate an average clean speech signal over a processing window.

Yet another configuration of the present invention provides a machine readable medium or media having recorded thereon instructions configured to instruct an apparatus including at least one of a programmable processor and a digital signal processor to: convert a noisy speech signal into a cepstral representation or a log-spectral representation; estimate a temporal correlation of the representation of the noisy speech signal; determine an average of the noisy speech signal; construct and solve, subject to a minimization constraint, a system of linear equations utilizing a correlation structure of a clean speech training signal, the correlation of the representation of the noisy speech signal, and the average of the noisy speech signal; and select a sign of the solution of the system of linear equations to estimate an average clean speech signal over a processing window.

Configurations of the present invention provide effective and efficient estimations of speech communication channels without removal of phonetic information.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of the preferred embodiment(s) is merely exemplary in nature and is in no way intended to limit the invention, its application, or uses.

As used herein, a "noisy speech signal" refers to a signal corrupted and/or filtered by a communication channel. Also as used herein, a "clean speech signal" refers to a speech signal not filtered by a communication channel, i.e., one that is communicated by a system having a flat frequency response, or a speech signal used to train acoustic models for a speech recognition system. An "average clean version of a noisy speech signal" refers to an estimate of the noisy speech signal with an estimate of the corruption and/or filtering of the communication channel removed from the speech signal.

Figure 1:
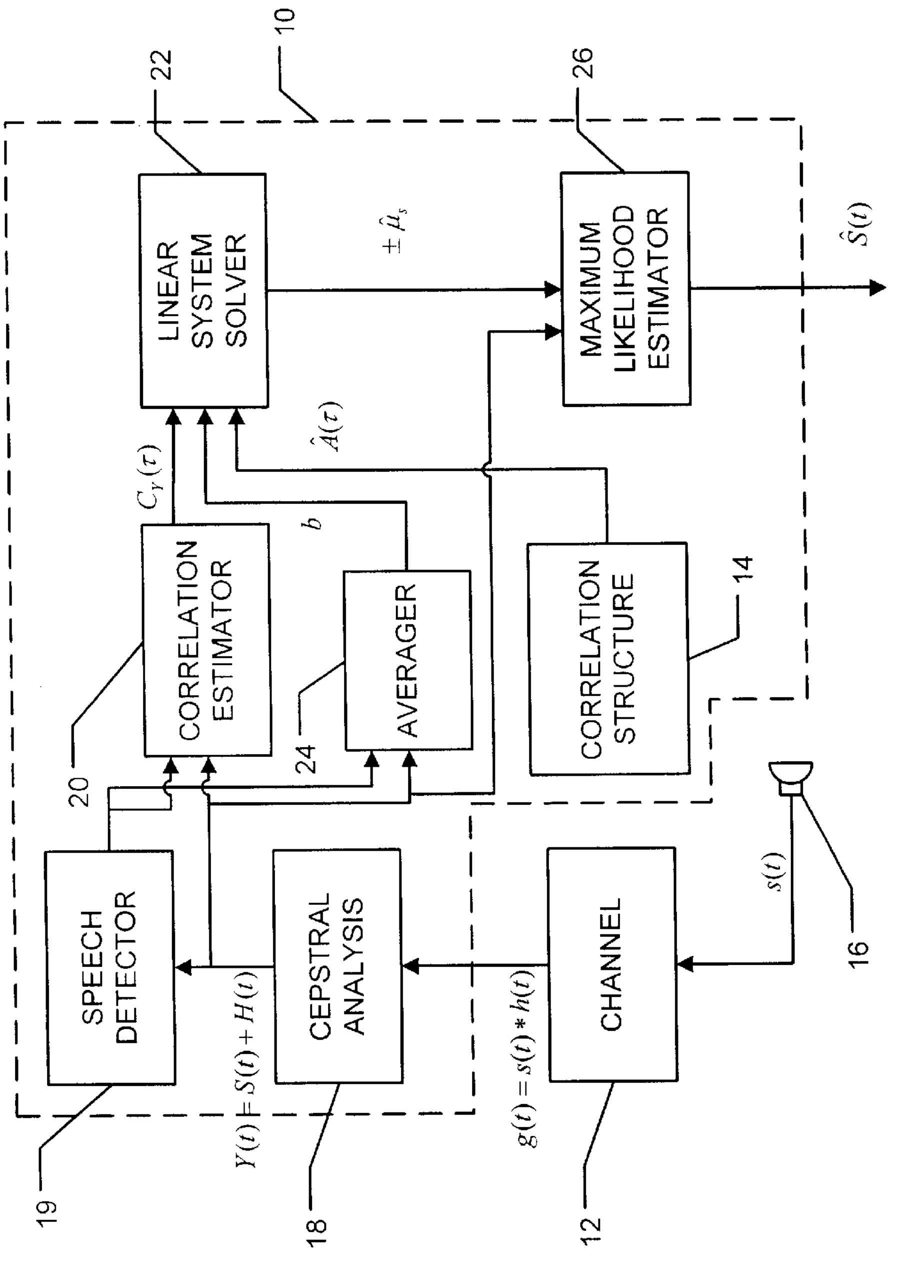
FIG. 1 is a functional block diagram of one configuration of a blind channel estimator of the present invention.

In one configuration of a blind channel estimator 10 of the present invention and referring to FIG. 1, a speech communication channel 12 is estimated and compensated utilizing a stored speech correlation structure $\hat{A}(\tau)$ 14. Blind channel estimator 10 as shown in FIG. 1 is representative of a portion of a speech recognition system, where the output of channel 12 is a noisy speech signal g(t)=s(t)*h(t), where s(t) represents a "clean" speech signal obtained using the output of microphone or audio processor 16 or via a filter having a flat frequency response, and h(t) represents the channel 12 filter. The signal represented by g(t) is converted into a signal Y(t)=S(t)+H(t) in the cepstral (or log spectral) domain by cepstral analysis module 18 (or by a log spectral analysis module, not shown).

Let S(t) be a "clean" speech signal represented in the cepstral (or log spectral) domain. Under the assumption that the inter-frame time correlation of clean speech is a decreasing function of $\tau$:

$$E[S(t)S^T(t+\tau)]=f_\tau(E[S(t)S(t)S^T(t)]), \tag{1}$$

$f_\tau$ is approximated by a time-invariant linear filter:

$$f_\tau(E[S(t)S(t)S^T(t)])=A(\tau)E[S(t)S^T(t)]. \tag{2}$$

An estimate $\hat{A}(\tau)$ of the matrix $A(\tau)$ is derived from a clean speech training signal s(t) by performing a cepstral analysis (i.e., obtaining S(t) in the cepstral domain) and then performing a correlation written as:

$$E[S(t)S^T(t+\tau)] \approx \frac{1}{N}\int_0^N S(t+\omega)S^T(t+\tau+\omega)d\omega, \tag{3}$$

averaging the ratio of $E[S(t)S^T(t+\tau)]$ and $E[S(t)S^T(t)]$ (i.e., a correlation at delay $\tau$ and at zero delay):

$$A(t,\tau) = \frac{E[S(t)S^T(t+\tau)]}{E[S(t)S^T(t)]}, \tag{4}$$

and integrating over the training database:

$$\hat{A}(\tau) = E[A(\tau)] \approx \frac{1}{N}\int_0^T A(t,\tau)dt \tag{5}$$

where the integral in equation 3 is carried out over the N samples of the processing window, and the integral in equation 5 is carried out over the whole training database. The computational steps described by equations 3 to 5 are carried out on a clean speech training signal obtained in an essentially noise-free environment so that a signal essentially equivalent to s(t) is obtained. Estimate $\hat{A}(\tau)$ obtained from this signal is stored in correlation structure module 14 prior to commencement of operation of blind channel estimator 10 with noisy channel 12.

For channel estimation, it is desirable to use small time lags for which the assumption in equation 1 is well verified, i.e., has small relative error, but not so small a time lag such that the speech signal correlation does not dominate the communication channel correlation.

Noisy speech signal Y(t) produced by cepstral analysis module 18 (or a corresponding log spectral module) is observed in the cepstral domain (or the corresponding log-spectral domain). Noisy speech signal Y(t) is written:

$$Y(t)=S(t)+H(t), \tag{6}$$

where S(t) is the cepstral domain representation of the original, clean speech signal s(t) and H(t) is the cepstral domain representation of the time-varying response h(t) of communication channel 12. The correlation of the observed signal Y(t) is then determined by correlation estimator 20. Let us represent the correlation function of signal Y(t) with a time-lag $\tau$ version Y(t+$\tau$) (or equivalently, Y(t−$\tau$)) as $C_Y(\tau)$, where $C_Y(\tau)=E[Y(t)Y^T(t+\tau)]$.

Linear system solver module 22 derives a term A from the correlation $C_Y$ produced by correlation estimator 20 and correlation structure $\hat{A}(\tau)$ stored in correlation structure module 14:

$$A=(I-\hat{A}(\tau))^{-1}(C_Y(\tau)-\hat{A}(\tau)C_Y(0)). \tag{7}$$

Also, averager module 24 determines a value b based on the output Y(t) of cepstral analysis module 18:

$$b=E[Y(t)], \tag{8}$$

and linear equation solver 22 solves the following system of equations for $\mu_s$:

$$\mu_s\mu_s^T=bb^T-A=B, \text{ and} \tag{9}$$

$$\mu_s+H=b. \tag{10}$$

Systems of equations 9 and 10 are overdetermined, meaning that the number of separate equations exceeds the number of unknowns. Thus, in blind channel estimator 10, the system of equations is solved as a minimization problem, such as a minimum mean square error problem. Equation 10 is solved for $\mu_s=\hat{s}$, where $\mu_s$ is an estimate of the average value of the mean speech signal without the channel corruption or filtering over a processing window, with linear system solver 22 minimizing $$\min_{\mu_s}\|\mu_s\mu_s^T-B\|^2. \tag{11}$$

(The estimate $\hat{\mu}_s$ in one configuration is not used for speech recognition, as the processing window for channel estimation is longer, e.g., 40–200 ms, than is the window used for speech recognition, e.g., 10–20 ms. However, in this configuration, $\hat{\mu}_s$ is used to estimate $$\hat{H}, \text{ where } \hat{H}=\frac{1}{T}\sum Y(t)-\hat{\mu}_s,$$

where the summation is over the processing window (e.g., 200 ms), and then S(t) is used for recognition in a shorter processing window, where $\hat{S}(t)=Y(t)-\hat{H}$.) In this configuration, S(t) represents clean speech over a shorter processing window, and is referred to herein as "short window clean speech."

In one configuration of the present invention, an efficient minimization is performed by linear system solver 22 by setting $$\mu_s=\pm\lambda_1 p_1, \tag{12}$$

where $\lambda_1$ is the largest eigenvalue of B and $p_1$ is the corresponding eigenvector. The solution to equation 12 is obtained in this configuration by searching for the eigenvector corresponding to the largest eigenvalue (in absolute value). This is a sub case of diagonalization problem for non-symmetric real matrices. Methods are known for solving this type of problem, but their precision is bounded by the ratio between the largest and smallest eigenvalues, i.e., the numerical methods are more stable for larger eigenvalue differences. Experimentally, the largest and second largest eigenvalues in configurations of the present invention have been found to differ by between about one and two orders of magnitude. Therefore, adequate stability is provided, and it is safe to assume that there exists one eigenvector that minimizes the cost function much better than any others. This eigenvector provides an estimate of the average clean speech $\hat{\mu}_s$ over the processing window.

Because the speech estimate is obtained in modulus, a heuristic is utilized to obtain the correct sign. In blind channel estimator 10, acoustic models are used by maximum likelihood estimator module 26 to determine the sign of the solution to equation 12. For example, the maximum likelihood estimation is performed in two decoding passes, or with speech and silence Gaussian mixture models (GMMs).

Figure 2:
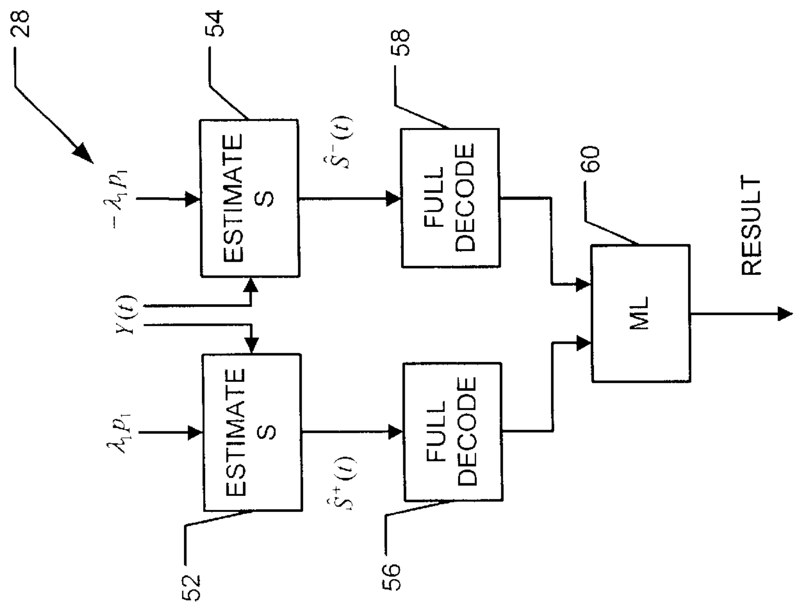
FIG. 2 is a block diagram of a two-pass implementation of a maximum likelihood module suitable for use in the configuration of FIG. 1.

In one configuration of a two-pass maximum likelihood estimator block 26 and referring to FIG. 2, Y(t) is input to two estimator modules 52, 54. Estimator module 52 also receives $\hat{\mu}_s$ as input, and estimator module 54 also receives $-\hat{\mu}_s$ as input. The result from estimator module 52 is $\hat{S}^+(t)$, while the result from estimator module 54 is $\hat{S}^-(t)$. These results are input to full decoders 56 and 58, respectively, which perform speech recognition. The output of full decoders 56 and 58 are input to a maximum likelihood selector module 60, which selects, as a result, words output from full decoders 56 and 58 using likelihood information that accompanies the speech recognition output from decoders 56 and 58. In one configuration not shown in FIG. 2, maximum likelihood selector module 60 outputs $\hat{S}(t)$ as either $\hat{S}^+(t)$ or $-\hat{S}^-(t)$. The output of S(t) is either in addition to or as an alternative to to the decoded speech output of decoder modules 56 and 58, but is still dependent upon the likelihood information provided by modules 56 and 58.

Figure 3:
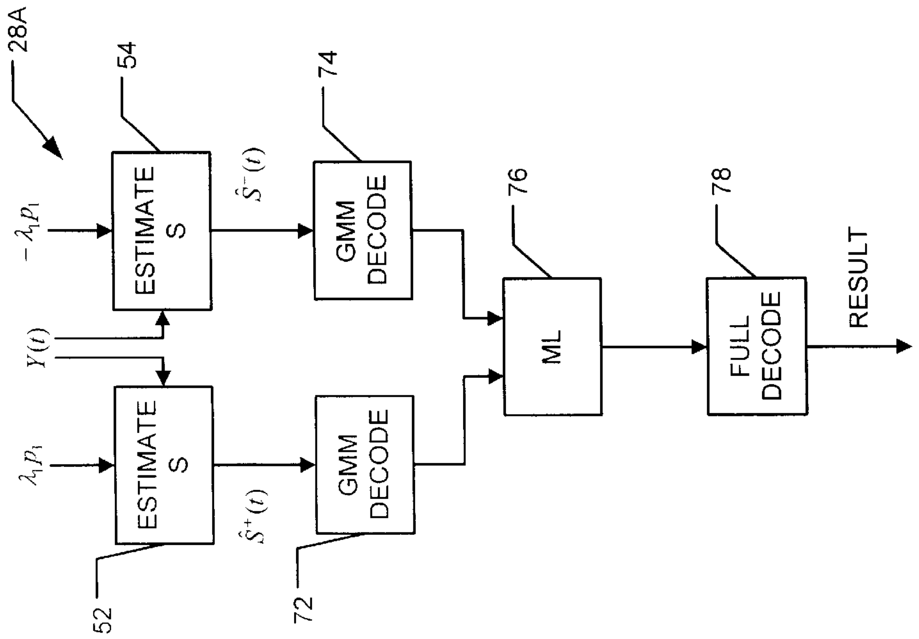
FIG. 3 is a block diagram of a two-pass GMM implementation of a maximum likelihood module suitable for use in the configuration of FIG. 1.

As an alternative to two-pass maximum likelhood determination block 26 of FIG. 2, a configuration of a two-pass GMM maximum likelihood decoding module 26A is represented in FIG. 3. In this configuration, estimates $\hat{\mu}_s$ and $-\hat{\mu}_s$ are input to speech and silence GMM decoders 72 and 74 respectively, and a maximum likelihood selector module 76 selects from the output of GMM decoders 72 and 74 to determine $\hat{S}(t)$, which is output in one configuration. In one configuration and as shown in FIG. 3, the output of maximum likelihood selector module 76 is provided to full speech recognition decode module 78 to produce a resulting output of decoded speech.

Figure 4:
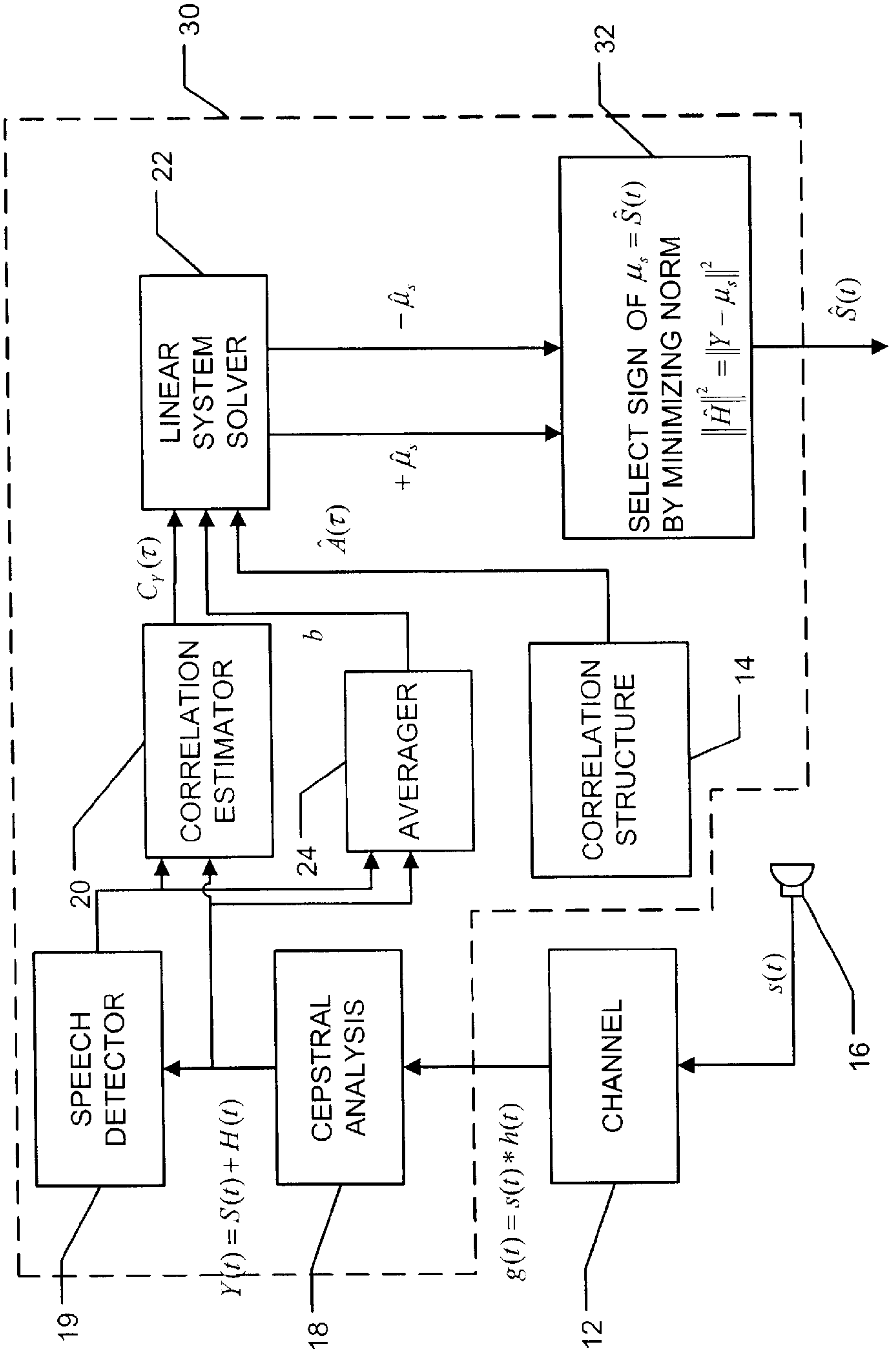
FIG. 4 is a functional block diagram of a second configuration of a blind channel estimator of the present invention.

In another configuration of a blind channel estimator 30 of the present invention and referring to FIG. 4, the same minimization is utilized in linear system solver module 22, but a minimum channel norm module 32 is used to determine the sign of the solution. In blind channel estimator 30, the sign of $\hat{\mu}_s=\hat{S}(t)$ that minimizes the norm of the channel cepstrum $\|H(t)\|^2=\|Y-\hat{\mu}_s\|^2$ is selected as the correct sign of the solution $\pm\hat{\mu}_s$. This solution for the sign is based on the assumption that, on average, the norm of the channel cepstrum is smaller than the norm of the speech cepstrum, so that the sign of $\pm\hat{\mu}_s$ that minimizes $\|H(t)\|^2=\|Y-\hat{\mu}_s\|^2$ is selected as the speech signal $\hat{S}(t)$.

The estimated speech signal $\hat{S}(t)$ in the cepstral domain (or log-spectral domain) is suitable for further analysis in speech processing applications, such as speech or speaker recognition. The estimated speech signal may be utilized directly in the cepstral (or log-spectral) domain, or converted into another representation (such as the time or frequency domain) as required by the application.

Figure 5:
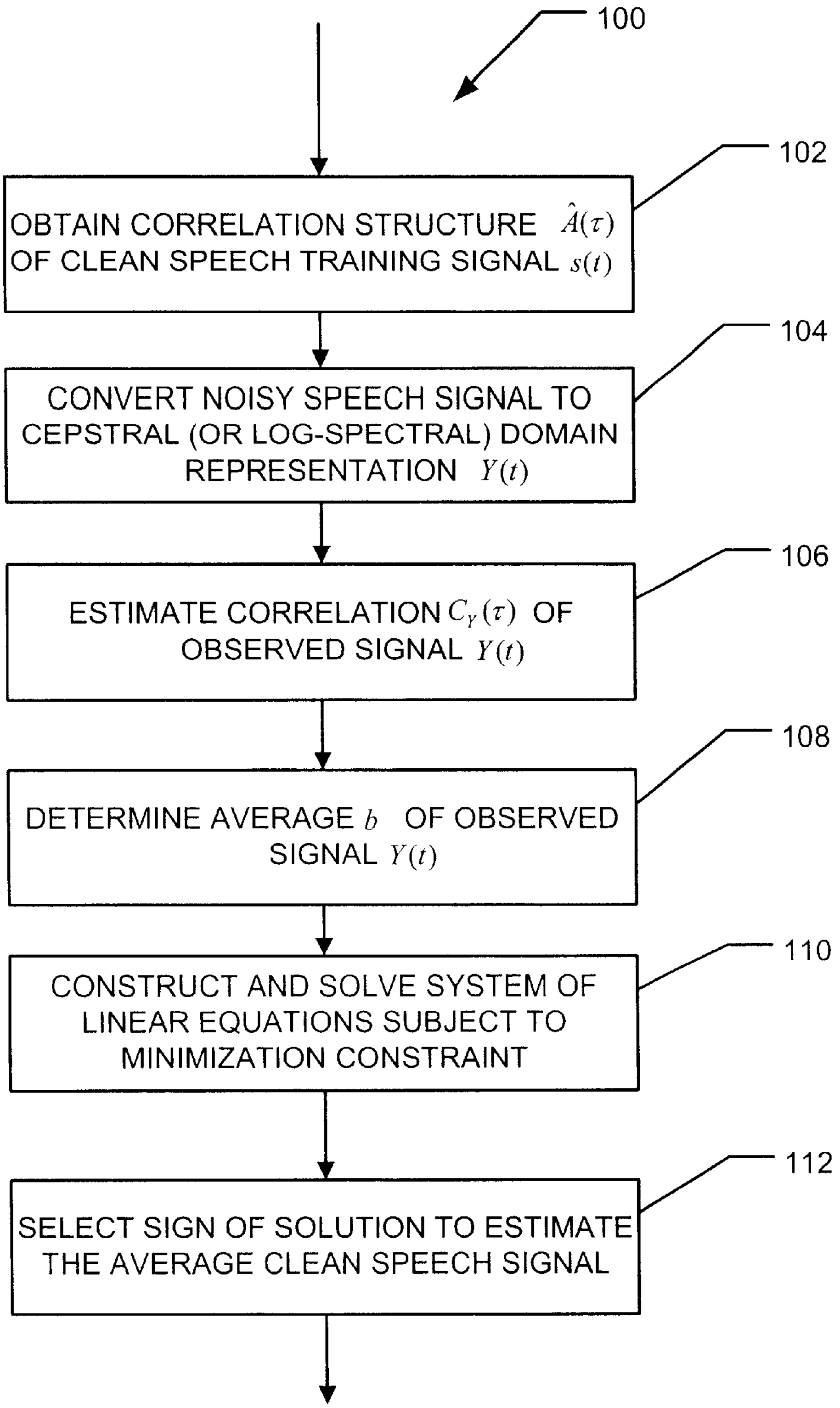
FIG. 5 is a flow chart illustrating one configuration of a blind channel estimation method of the present invention.

In one configuration of a blind channel estimation method 100 of the present invention and referring to FIG. 5, a method is provided for blind channel estimation based upon a speech correlation structure. A correlation structure $\hat{A}(t)$ is obtained 102 from a clean speech training signal s(t). The computational steps described by equations 3 to 5 are carried out by a processor on a clean speech training signal obtained in an essentially noise-free environment so that the clean speech signal is essentially equivalent to s(t).

A noisy speech signal g(t) to be processed is then obtained and converted 104 to a cepstral (or log-spectral) domain representation Y(t). Y(t) is then used to estimate 106 a correlation $C_Y(\tau)$ and to determine 108 an average b of the observed signal Y(t). The system of linear equations 9 and 10 is constructed and solved 110 subject to the minimization constraint of equation 11. A maximum likelihood method or norm minimalization method is utilized to select or determine 112 the sign of the solution, which thereby produces an estimate of the average clean speech signal over the processing window.

Better results are obtained with configurations of the present invention when the speech source and the communication channel more closely meet four conditions:

1. S(t) and H(t) are two independent stochastic processes.
2. E[S(t+τ)]=E[S(t)], i.e., S(t) is a short-term stationary process.
3. The channel H(t) is constant within the processing window, so that H(t)=H, i.e., short-term invariance applies.
4. The correlation structure of the speech source satisfies the time-invariant linear filter model, i.e., $E[S(t)S^T(t+\tau)]=A(\tau)E[S(t)S^T(t)]$.

These conditions are considered to be sufficiently satisfied for small time-lags (short term structure). However, the second condition is not strictly satisfied when using the usual expectation estimator:

$$E[S(t)S^T(t+\tau)] = \frac{1}{N-\tau}\sum_{i=1}^{N-\tau} S(i)S^T(i+\tau). \tag{13}$$

Therefore, one configuration of the present invention utilizes a circular processing window:

$$E[S(t)S^T(t+\tau)] = \frac{1}{N-\tau}\sum_{i=1}^{N-\tau} S(i)S^T(i+\tau) + \frac{1}{\tau}\sum_{i=1}^{\tau} S(N-i)S^T(i). \tag{14}$$

Also, in one configuration of the present invention, to more closely satisfy the correlation structure condition, a speech presence detector is utilized to ensure that silence frames are disregarded in determining correlation, and only speech frames are considered. In addition, short processing windows are utilized to more closely satisfy the short-term invariance condition. One configuration of the present invention thus provides a speech detector module 19 to distinguish between the presence and absence of a speech signal, and this information is utilized by correlation estimator module 20 and averager module 24 to ensure that only speech frames are considered.

In one configuration of the present invention, the methods described above are applied in the cepstral domain. In another configuration, the methods are applied in the log-spectral domain. In one configuration, to ensure the precision of a diagonalization method utilized to solve the mean square error problem, the dynamic range of coefficients in the cepstral or log-spectral domain are made comparable to one another. (There are, in general, a plurality of coefficients because the cepstral or log-spectral features are vectors.) For example, in one configuration, cepstral coefficients are normalized by subtracting out a long-term mean and the covariance matrix is whitened. In another configuration, log-spectral coefficients are used instead of cepstral coefficients.

Cepstral coefficients are utilized for channel removal in one configuration of the present invention. In another configuration, log-spectral channel removal is performed. Log-spectral channel removal may be preferred in some applications because it is local in frequency.

In one configuration of the present invention, a time lag of four frames (40 ms) is utilized to determine incoming signal correlation. This configuration has been found to be an effective compromise between low speech correlation and low intrinsic hypothesis error. More specifically, if the processing window is excessively long, H(t) may not be constant, whereas if the processing window is excessively short, it may not be possible to get good correlation estimates.

Configurations of the present invention can be realized physically utilizing one or more special purpose signal processing components (i.e., components specifically designed to carry out the processing detailed above), general purpose digital signal processor under control of a suitable program, general purpose processors or CPUs under control of a suitable program, or combinations thereof, with additional supporting hardware (e.g., memory) in some configurations. For real-time speech recognition (for example, speech control of vehicles or type-as-you-speak computer systems), a microphone or similar transducer and an audio analog-to-digital (ADC) converter would be used to input speech from a user. Instructions for controlling a general purpose programmable processor or CPU and/or a general purpose digital signal processor can be supplied in the form of ROM firmware, in the form of machine-readable instructions on a suitable medium or media, not necessarily removable or alterable (e.g., floppy diskettes, CD-ROMs, DVDs, flash memory, or hard disk), or in the form of a signal (e.g., a modulated electrical carrier signal) received from another computer. An example of the latter case would be instructions received via a network from a remote computer, which may itself store the instructions in a machine-readable form.

A further mathematical analysis of the configuration described herein follows.

A speech signal corrupted by a communication communication channel observed in a cepstral domain (or a log-spectral domain) is characterized by equation 6 above. The correlation at time t with time lag $\tau$ of a signal X is given by:

$$C_X(\tau)=E[X(t)X^T(t+\tau)]. \quad (15)$$

Assuming the independence, short-term stationarity, and short-term invariance conditions defined in the text above, the correlation of the observed signal can be written:

$$C_Y(\tau)=C_S(\tau)+\mu_s H^T+H\mu_S^T+HH^T, \quad (16)$$

where $\mu_s$=E[S(t)]. Equations 7 and 8 above are derived by assuming the short-term linear correlation structure condition defined in the text above.

An efficient minimization is derived by considering the following minimization problem in the $N_2$ norm:

$$\min_X \left\| XX^T - B \right\|^2, \quad (17)$$

where $X=[x_1 x_2 \ldots x_n]^T$ and $B=(b_{i,j})_{i,j\in 1, \ldots, n}$. Provided that B is diagonalizable, we can write B=PAP*, where $\Lambda=\mathrm{diag}\{\lambda_1 \ldots \lambda_n\}$ is a diagonal matrix and $P=\{p_1, \ldots, p_n\}$ is a unitary matrix. Consider the eigenvalues $\lambda_1 \ldots \lambda_n$ to be sorted in increasing order $\lambda_1 \geqq \ldots \geqq \lambda_n$. It can be shown that:

$$\min_X \left\| XX^T - B \right\|^2 \sim \min_Y \left\| YY^T - \Lambda \right\|^2, \quad (18)$$

with $Y=P^T X$. It can also be written:

$$\|YY^T - \Lambda\|^2 = \sum_i^n (y_i^2 - \lambda_i)^2 + \sum_i \sum_{j\neq i} (y_i, y_j)^2. \quad (19)$$

By taking partial derivatives, we have:

$$\frac{\partial \|YY^T - \Lambda\|^2}{\partial y_k} = 4y_k\left(\sum_i y_i^2 - \lambda_k\right). \quad (20)$$

By setting the derivatives to zero, we obtain:

$$4y_k\left(\sum_i y_i^2 - \lambda_k\right) = 0, \forall k = 1 \ldots n. \quad (21)$$

Since it has been assumed that $\lambda_1 > \ldots > \lambda_n$, from the previous equation, it follows that at most one coefficient among $y_1 \ldots y_n$ is nonzero. By contradiction, assume that $\exists i_1 \neq i_2 : y_{i_1} \neq 0,\ y_{i_2} \neq 0$, then we would obtain:

$$\sum_i y_i^2 = \lambda_{i1}, \quad (22)$$

$$\sum_i y_i^2 = \lambda_{i2}, \quad (23)$$

and $\lambda_{i_1} \neq \lambda_{i_2}$, which is impossible. Moreover, given that Y is a non-zero vector, we have:

$$\begin{cases} y_{i_0} = \pm\lambda_{i_0} \\ y_i = 0 \quad \forall\, i \neq i_0 \end{cases} \quad (24)$$

Therefore, we conclude that $\|YY^T-\Lambda\|^2=\Sigma_{i\neq i_0}\lambda_i^2$ and the solution that minimizes $\|YY^T-\Lambda\|^2$ is $i_0=1$. This also implies that the minimization problem has two solutions $X=\pm\lambda_1 p_1$, where $\lambda_1$ is the largest eigenvalue of B and $p_1$ is the corresponding eigenvector.

Configurations of the present invention provide effective estimation of a communication channel corrupting a speech signal. Experiments utilizing the methods and apparatus described herein have been found to be more effective that standard cepstral mean normalization techniques because the underlying assumptions are better verified. These experiments also showed that static cepstral features, with channel compensation using minimum norm sign estimation, provide a significant improvement compared to CMN. For maximum likelihood sign estimation, it is recommended that one consider the channel sign as a hidden variable and optimize for it during the expectation maximum (EM) algorithm, while jointly estimating the acoustic models.

In general, for a configuration of the present invention utilizing the cepstral domain throughout, there is a corresponding configuration of the present invention that utilizes the cepstral domain throughout. Once a design choice of one or the other domain is made, it should be used consistently throughout the configuration to avoid the need for additional conversions from one domain to the other.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for blind channel estimation of a speech signal corrupted by a communcation channel, said method comprising:

converting a noisy speech signal into a representation of the noisy speech signal selected from the group consisting of a cepstral representation and a log-spectral representation;

estimating a correlation of the representation of the noisy speech signal;

determining an average of the noisy speech signal;

constructing and solving, subject to a minimization constraint, a system of linear equations utilizing a correlation structure of a clean speech training signal, the correlation of the representation of the noisy speech signal, and the average of the noisy speech signal; and selecting a sign of the solution of the system of linear equations to estimate an average clean speech signal over a processing time window.

2. A method in accordance with claim 1 further comprising:

using the average clean speech estimate to determine an average channel estimate over the processing time window; and using the average channel estimate to determine an estimate of the clean speech signal over a shorter processing time window.

3. A method in accordance with claim 1 wherein said selecting a sign of the solution of the system of linear equations comprises selecting a sign utilizing a maximum likelihood criterion.

4. A method in accordance with claim 1 wherein said selecting a sign of the solution of the system of linear equations comprises selecting a sign to minimize a norm of estimated channel noise.

5. A method in accordance with claim 1 wherein said converting a noisy speech signal into a representation of the noisy speech signal selected from the group consisting of a cepstral representation and a log-spectral representation comprises converting the noisy speech signal into a cepstral representation.

6. A method in accordance with claim 1 wherein said converting a noisy speech signal into a representation of the noisy speech signal selected from the group consisting of a cepstral representation and a log-spectral representation comprises converting the noisy speech signal into a log-spectral representation.

7. A method in accordance with claim 1 further comprising obtaining a clean speech training signal in a substantially noise-free environment, and determining said correlation structure utilizing said clean speech training signal.

8. A method in accordance with claim 1 wherein:

said correlation structure is written $\hat{A}(\tau)$;

said representation of the noisy speech signal is written $Y(t)=S(t)+H(t)$, wherein $Y(t)$ is the representation of the noisy speech signal, $S(t)$ is a representation of clean speech of the noisy speech signal, and $H(t)$ is a representation of the time-varying response of a communication channel;

said estimating a correlation of the representation of the noisy speech signal comprises determining $C_Y(\tau)$, where $C_Y(\tau)=E[YtY^T(t+\tau)]$;

said determining an average of the noisy speech signal comprises determining $b=E[Y(t)]$;

said constructing and solving a system of linear equations comprises solving a system of linear equations written:

$$\mu_s\mu_s^T=bb^T-A=B,$$

and $$\mu_s+H=b$$

for $\mu_s$, a representation of an average clean speech signal, wherein:

$$A=(I-\hat{A}(\tau))^{-1}(C_Y(\tau)-\hat{A}(\tau)C_Y(0)),$$

and $$b=E[Y(t)].$$

9. A method in accordance with claim 8 wherein said constructing and solving a system of linear equations comprises solving said system of linear equations subject to a minimization constraint written $$\min_{\mu_s}\|\mu_s\mu_s^T-B\|^2.$$

10. A method in accordance with claim 8 wherein said constructing and solving a system of linear equations comprises determining $\mu_s$ as $\pm\lambda_1 p_1$, where $\lambda_1$ is the largest eigenvalue of B and $p_1$ is the corresponding eigenvector.

11. A method in accordance with claim 10 further comprising utilizing a maximum likelihood criterion to select a sign of $\mu_s$.

12. A method in accordance with claim 11 further comprising selecting a sign of $\mu_s$ that minimizes the norm of channel cepstrum $\|H(t)\|^2=\|Y-\mu_s\|^2$.

13. A method in accordance with claim 8 further comprising estimating $\hat{A}(\tau)$ from a clean speech training signal written s(t) as:

$$\hat{A}(\tau)=E[A(\tau)]\approx\frac{1}{N}\int_0^T A(t,\tau)\,dt,$$

wherein:

$$A(t,\tau)=\frac{E[S(t)S^T(t+\tau)]}{E[S(t)S^T(t)]},$$

$$E[S(t)S^T(t+\tau)]\approx\frac{1}{N}\int_0^N S(t+\omega)S^T(t+\tau+\omega)\,d\omega.$$

and S(t) is a cepstral or log-cepstral representation of s(t).

14. An apparatus for blind channel estimation of a speech signal corrupted by a communication channel, said apparatus configured to:

convert a noisy speech signal into a representation of the noisy speech signal selected from the group consisting of a cepstral representation and a log-spectral representation;

estimate a correlation of the representation of the noisy speech signal;

determine an average of the noisy speech signal;

construct and solve, subject to a minimization constraint, a system of linear equations utilizing a correlation structure of a clean speech training signal, the correlation of the representation of the noisy speech signal, and the average of the noisy speech signal; and select a sign of the solution of the system of linear equations to estimate an average clean speech signal over a processing time window.

15. An apparatus in accordance with claim 14 further configured to:

use the average clean speech estimate to determine an average channel estimate over the processing time window; and use the average channel estimate to determine an estimate of the clean speech signal over a shorter processing time window.

16. An apparatus in accordance with claim 14 wherein to select a sign of the solution of the system of linear equations, said apparatus is configured to select a sign utilizing a maximum likelihood criterion.

17. An apparatus in accordance with claim 14 wherein to select a sign of the solution of the system of linear equations, said apparatus is configured to select a sign to minimize a norm of estimated channel noise.

18. An apparatus in accordance with claim 14 wherein to convert a noisy speech signal into a representation of the noisy speech signal selected from the group consisting of a cepstral representation and a log-spectral representation, said apparatus is configured to convert the noisy speech signal into a cepstral representation.

19. An apparatus in accordance with claim 14 wherein to converting a noisy speech signal into a representation of the noisy speech signal selected from the group consisting of a cepstral representation and a log-spectral representation, said apparatus is configured to convert the noisy speech signal into a log-spectral representation.

20. An apparatus in accordance with claim 14 further configured to obtain a clean speech training signal in a substantially noise-free environment, and to determine said correlation structure utilizing said clean speech training signal.

21. An apparatus in accordance with claim 14 wherein:

said correlation structure is written $\hat{A}(\tau)$;

said representation of the noisy speech signal is written $Y(t)=S(t)+H(t)$, wherein $Y(t)$ is the representation of the noisy speech signal, $S(t)$ is a representation of clean speech of the noisy speech signal, and $H(t)$ is a representation of the time-varying response of a communication channel;

to estimate a correlation of the representation of the noisy speech signal, said apparatus is configured to determine $C_Y(\tau)$, where $C_Y(\tau)=E[YtY^T(t+\tau)]$;

to determine an average of the noisy speech signal, said apparatus is configured to determine $b=E[Y(t)]$;

to construct and solve a system of linear equations, said apparatus is configured to solve a system of linear equations written:

$$\mu_s\mu_s^T=bb^T-A=B,$$

and $$\mu_s+H=b$$

for $\mu_s$, a representation of an average clean speech signal, wherein:

$$A=(I-\hat{A}(\tau))^{-1}(C_Y(\tau)-\hat{A}(\tau)C_Y(0)),$$

and $$b=E[Y(t)].$$

22. An apparatus in accordance with claim 21 wherein to construct and solve a system of linear equations, said apparatus is configured to solve said system of linear equations subject to a minimization constraint written $$\min_{\mu_s}\left\|\mu_s\mu_s^T-B\right\|^2.$$

23. An apparatus in accordance with claim 21 wherein to construct and solve a system of linear equations, said apparatus is configured to determine $\mu_s$ as $\pm\lambda_1 p_1$, where $\lambda_1$ is the largest eigenvalue of B and $p_1$ is the corresponding eigenvector.

24. An apparatus in accordance with claim 23 further configured to utilize a maximum likelihood criterion to select a sign of $\mu_s$.

25. An apparatus in accordance with claim 24 further configured to select a sign of $\mu_s$ that minimizes the norm of channel cepstrum $\|H(t)\|^2=\|Y-\mu_s\|^2$.

26. An apparatus in accordance with claim 21 further configured to estimate $\hat{A}(\tau)$ from a clean speech training signal written s(t) as:

$$\hat{A}(\tau)=E[A(\tau)]\approx\frac{1}{N}\int_0^T A(t,\tau)\,dt,\text{ wherein:}$$

$$A(t,\tau)=\frac{E[S(t)S^T(t+\tau)]}{E[S(t)S^T(t)]},$$

$$E[S(t)S^T(t=\tau)]\approx\frac{1}{N}\int_0^N S(t+\omega)S^T(t+\tau+\omega)d\omega.$$

and S(t) is a cepstral or log-cepstral representation of s(t).

27. A machine readable medium or media having recorded thereon instructions configured to instruct an apparatus comprising at least one member of the group consisting of a programmable processor and a digital signal processor to:

convert a noisy speech signal into a representation of the noisy speech signal selected from the group consisting of a cepstral representation and a log-spectral representation;

estimate a correlation of the representation of the noisy speech signal;

determine an average of the noisy speech signal;

construct and solve, subject to a minimization constraint, a system of linear equations utilizing a correlation structure of a clean speech training signal, the correlation of the representation of the noisy speech signal, and the average of the noisy speech signal; and select a sign of the solution of the system of linear equations to estimate an average clean speech signal in a processing time window.

28. A medium or media in accordance with claim 27 wherein said instructions include instructions to:

use the average clean speech estimate to determine an average channel estimate over the processing time window; and use the average channel estimate to determine an estimate of the clean speech signal over a shorter processing time window.

29. A medium or media in accordance with claim 27 wherein to select a sign of the solution of the system of linear equations, said recorded instructions include instructions to select a sign utilizing a maximum likelihood criterion.

30. A medium or media in accordance with claim 27 wherein to select a sign of the solution of the system of linear equations, said recorded instructions include instructions to select a sign to minimize a norm of estimated channel noise.

31. A medium or media in accordance with claim 27 wherein to convert a noisy speech signal into a representation of the noisy speech signal selected from the group consisting of a cepstral representation and a log-spectral representation, said recorded instructions include instructions to convert the noisy speech signal into a cepstral representation.

32. A medium or media in accordance with claim 27 wherein to convert a noisy speech signal into a representation of the noisy speech signal selected from the group consisting of a cepstral representation and a log-spectral representation, said instructions include instructions to convert the noisy speech signal into a log-spectral representation.

33. A medium or media in accordance with claim 27 wherein said recorded instructions further include instructions to obtain a clean speech training signal in an essentially noise-free environment, and to determine said correlation structure utilizing said clean speech training signal.

34. A medium or media in accordance with claim 27 wherein:

said correlation structure is written $\hat{A}(\tau)$;

said representation of the noisy speech signal is written $Y(t)=S(t)+H(t)$, wherein $Y(t)$ is the representation of the noisy speech signal, $S(t)$ is a representation of clean speech of the noisy speech signal, and $H(t)$ is a representation of the time-varying response of a communication channel;

to estimate a correlation of the representation of the noisy speech signal, said apparatus is configured to determine $C_Y(\tau)$, where $C_Y(\tau)=E[YtY^T(t+\tau)]$;

to determine an average of the noisy speech signal, said apparatus is configured to determine $b=E[Y(t)]$; and to construct and solve a system of linear equations, said apparatus is configured to solve a system of linear equations written:

$$\mu_s\mu_s^T=bb^T-A=B,$$

and $$\mu_s+H=b$$

for $\mu_s$, a representation of an average clean speech signal, wherein:

$$A=(I-\hat{A}(\tau))^{-1}(C_Y(\tau)-\hat{A}(\tau)C_Y(0)),$$

and $$b=E[Y(t)].$$

35. A medium or media in accordance with claim 34 wherein to construct and solve a system of linear equations, said recorded instructions include instructions to solve said system of linear equations subject to the minimization constraint written $$\min_{\mu_s}\left\|\mu_s\mu_s^T-B\right\|^2.$$

36. A medium or media in accordance with claim 34 wherein to construct and solve a system of linear equations, said recorded instructions include instructions to determine $\mu_s$ as $\pm\lambda_1 p_1$, where $\lambda_1$ is the largest eigenvalue of B and $p_1$ is the corresponding eigenvector.

37. A medium or media in accordance with claim 36 wherein said recorded instructions further comprise instructions to utilize a maximum likelihood criterion to select a sign of $\mu_s$.

38. A medium or media in accordance with claim 37 wherein said recorded instructions further comprise instructions to select a sign of $\mu_s$ that minimizes the norm of channel cepstrum $\|H(t)\|^2=\|Y-\mu_s\|^2$.

39. A medium or media in accordance with claim 34 wherein said recorded instructions further comprise instructions to estimate $\hat{A}(\tau)$ from a clean speech training signal written s(t) as:

$$\hat{A}(\tau)=E[A(\tau)]\approx\frac{1}{N}\int_0^T A(t,\tau)\,dt,\text{ wherein:}$$

$$A(t,\tau)=\frac{E[S(t)S^T(t+\tau)]}{E[S(t)S^T(t)]},$$

$$E[S(t)S^T(t=\tau)]\approx\frac{1}{N}\int_0^N S(t+\omega)S^T(t+\tau+\omega)d\omega.$$

and S(t) is a cepstral or log-cepstral representation of s(t).

* * * * *